(12) United States Patent
Iwata et al.

(10) Patent No.: US 11,855,271 B2
(45) Date of Patent: Dec. 26, 2023

(54) METAL AIR BATTERY, CATHODE MANUFACTURING METHOD OF METAL AIR BATTERY AND MANUFACTURING METHOD OF METAL AIR BATTERY

(71) Applicant: Nippon Telegraph and Telephone Corporation, Tokyo (JP)

(72) Inventors: Mikayo Iwata, Musashino (JP); Masaya Nohara, Musashino (JP); Hiroaki Taguchi, Musashino (JP); Yuzu Kobayashi, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/780,285

(22) PCT Filed: Dec. 3, 2019

(86) PCT No.: PCT/JP2019/047162
§ 371 (c)(1),
(2) Date: May 26, 2022

(87) PCT Pub. No.: WO2021/111515
PCT Pub. Date: Jun. 10, 2021

(65) Prior Publication Data
US 2022/0416329 A1 Dec. 29, 2022

(51) Int. Cl.
*H01M 12/06* (2006.01)
*H01M 4/88* (2006.01)
(Continued)

(52) U.S. Cl.
CPC ....... *H01M 12/065* (2013.01); *H01M 4/8882* (2013.01); *H01M 4/9016* (2013.01); *H01M 2004/8689* (2013.01)

(58) Field of Classification Search
CPC .............. H01M 12/06; H01M 12/065; H01M 2004/8689; H01M 4/8605; H01M 4/8626;
(Continued)

(56) References Cited

U.S. PATENT DOCUMENTS

2010/0285375 A1  11/2010  Friesen et al.
2012/0321968 A1* 12/2012  Sato ................... H01M 4/9016
                                                      429/480
2019/0237834 A1   8/2019  Nohara et al.

FOREIGN PATENT DOCUMENTS

JP    2012527090 A     11/2012
JP    2017091601 A  *   5/2017  ............ H01M 12/08
(Continued)

OTHER PUBLICATIONS

Machine translation JP2017091601A (Year: 2017).*
(Continued)

*Primary Examiner* — Victoria H Lynch
(74) *Attorney, Agent, or Firm* — Workman Nydegger

(57) ABSTRACT

A metal-air battery includes: a cathode formed of a co-continuous body having a three dimensional network structure formed by an integrated plurality of nanostructures having branches; a foil- or plate-like anode formed of a metal; a separator that absorbs a liquid, which is to be an electrolytic solution; and a foil- or plate-like current collector formed of a metal. The metal-air battery is formed with a wound structure in which the current collector, the cathode, the separator, the anode, and the separator are superimposed and wound in this order.

9 Claims, 6 Drawing Sheets

(51) Int. Cl.
*H01M 4/90* (2006.01)
*H01M 4/86* (2006.01)

(58) Field of Classification Search
CPC ............. H01M 4/8875; H01M 4/8882; H01M 4/9016; H01M 4/9041; Y02E 60/10
See application file for complete search history.

(56) References Cited

FOREIGN PATENT DOCUMENTS

| | | |
|---|---|---|
| JP | 2017-117524 A | 6/2017 |
| WO | 2011087089 A1 | 7/2011 |
| WO | 2018/003724 A1 | 1/2018 |

OTHER PUBLICATIONS

Yejian Xue et al., *Template-Directed Fabrication of Porous Gas Diffusion Layer for Magnesium Air Batteries,* Journal of Power Sources, vol. 297, 2015, pp. 202-207.

Naiguang Wang et al., *Discharge Behaviour of Mg—Al—Pb and Mg—Al—Pb—In Alloys as Anodes for Mg-Air Battery,* Electrochimica Acta, vol. 149, 2014, pp. 193-205.

\* cited by examiner

METAL AIR BATTERY, CATHODE MANUFACTURING METHOD OF METAL AIR BATTERY AND MANUFACTURING METHOD OF METAL AIR BATTERY

TECHNICAL FIELD

The present invention relates to a metal-air battery and a method for producing a metal-air battery.

BACKGROUND ART

Conventionally, alkaline batteries and zinc-carbon batteries have widely been used as disposable primary batteries. Also, along with the evolution of IoT (Internet of Things) in recent years, the development of scattering sensors, which are installed at each and every place in the natural world such as soil and forest is advancing. Small sized high performance coin type lithium primary batteries corresponding to a variety of applications such as these sensors are being widespread.

However, the disposable batteries generally used at present are often constituted by a rare metal such as lithium, nickel, manganese and cobalt, and thus have a problem of the depletion of resources. In addition, a strong alkali such as an aqueous sodium hydroxide solution or an organic electrolytic solution is used as the electrolytic solution, and this makes the final disposal difficult. Moreover, the presently used disposable batteries may pose a risk of affecting the surrounding environment depending on the environment at which the batteries are used, such as a case in which they are used as the driving source for sensors to be buried in soil.

As one of the batteries that are being researched and developed as the next generation battery in order to solve the problems as mentioned above, mention may be made of an air battery. In the air battery, oxygen in air used as the cathode active material is supplied from outside the battery, and therefore, the battery cell can be filled with a metal anode. For the anode, metals such as magnesium, iron, aluminum, and zinc can be used, and by using materials that are abundant in terms of resources, it is possible to configure batteries with low cost and low environmental load.

In particular, a zinc-air battery, which uses zinc as the anode, is commercially available as the driving source for hearing aids or the like, and the research and development of a magnesium-air battery in which magnesium is used as the anode is also in progress as a battery with a low environmental load (see Non-Patent Literature 1 and Non-Patent Literature 2). In Non-Patent Literature 1, a fluororesin is used as a binder for the cathode. In Non-Patent Literature 2, a metal including lead or indium is used as the anode. For this reason, the technologies described in Non-Patent Literature 1 and Non-Patent Literature 2 pose a problem of not easy handling, such as not easy disposal and concerns about the impact on the surrounding environment.

In order to solve the problem described above, research on a metal-air battery using a binder-free cathode is in progress (Patent Literature 1).

In general, in order to increase the capacity of batteries, it is important to increase the electrode area, and a wound structure has been widely used as a structure that enables easy increase in capacity. By superimposing and winding the battery constituent members, the wound structure allows for a large electrode area while keeping the volume of batteries small.

CITATION LIST

Patent Literature

Patent Literature 1: International Publication No. WO 2018/003724

Non-Patent Literature

Non-Patent Literature 1: Y. Xue et al., "Template-directed fabrication of porous gas diffusion layer for magnesium air batteries", Journal of Power Sources, vpl. 297, pp. 202-207, 2015.

Non-Patent Literature 2: N. Wang et al., "Discharge behaviour of Mg—Al—Pb and Mg—Al—Pb—In alloys as anodes for Mg-air battery", Electrochimica Acta, vol. 149, pp. 193-205, 2014.

SUMMARY OF THE INVENTION

Technical Problem

However, although the above-mentioned binder-free cathode has stretchability, it is brittle to tensile or bending forces, which may limit the form of the battery if it is attempted to handle it as a co-continuous body.

The present invention has been made in view of the circumstances described above, and an object of the present invention is to provide a metal-air battery with a wound structure that enables increase in capacity using a cathode that is a binder-free co-continuous body, a method for producing a cathode of a metal-air battery, and a method for producing a metal-air battery.

Means for Solving the Problem

One aspect of the present invention provides a metal-air battery comprising: a cathode formed of a co-continuous body having a three dimensional network structure formed by an integrated plurality of nanostructures having branches; a foil- or plate-like anode formed of a metal; a separator that absorbs a liquid, which is to be an electrolytic solution; and a foil- or plate-like current collector formed of a metal, wherein the metal-air battery is formed with a wound structure in which the current collector, the cathode, the separator, the anode, and the separator are superimposed and wound in this order.

Another aspect of the present invention provides a method for producing a cathode of a metal-air battery, comprising: a freezing step of freezing a sol or gel in which a nanostructure is dispersed to obtain a frozen body; and a drying step of drying the frozen body in a vacuum to obtain a cathode formed of a co-continuous body.

Another aspect of the present invention provides a method for producing a cathode of a metal-air battery, comprising: a gel production step of allowing a bacterium to produce a gel in which a nanofiber made of any of iron oxide, manganese oxide, and cellulose is dispersed; a freezing step of freezing the gel; and a drying step drying the frozen body of the gel to obtain a cathode formed of a co-continuous body.

Another aspect of the present invention provides a method for producing the above-described metal-air battery, comprising: allowing a cathode produced by any of the above-described methods for producing a cathode of a metal-air battery to contain a volatile liquid that does not alter the structure of the cathode; and superimposing and winding a foil- or plate-like current collector formed of a metal, the cathode, a separator that absorbs a liquid, which is to be an electrolytic solution, a foil- or plate-like anode formed of a metal, and the separator in this order to thereby form a wound structure.

Effects of the Invention

According to the present invention, a metal-air battery with a wound structure that enables increase in capacity using a cathode that is a binder-free co-continuous body, a method for producing a cathode of a metal-air battery, and a method for producing a metal-air battery can be provided.

DESCRIPTION OF EMBODIMENTS

Hereinafter, with reference to the drawings, embodiments of the present invention will be described. In the description of the drawings, the same part is marked with the same reference sign and the explanation will be omitted.

Figure 1:
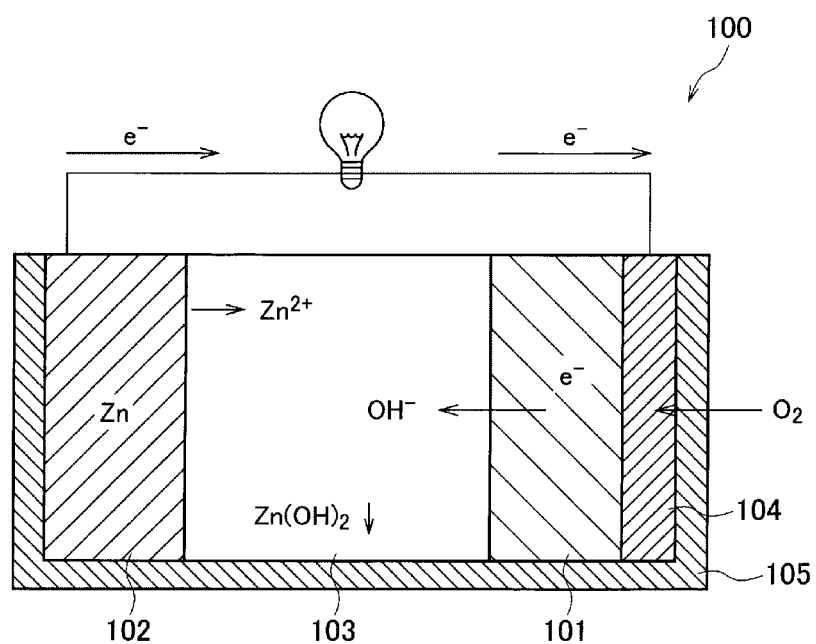
FIG. 1 is a diagram illustrating the principle of a zinc-air battery according to an embodiment of the present invention.

With reference to FIG. 1, as an example of a metal-air battery 100, the principle of a zinc-air battery according to an embodiment of the present invention will be described.

The zinc-air battery according to an embodiment of the present invention comprises a cathode 101, an anode 102, an electrolyte 103 sandwiched between the cathode 101 and the anode 102, and a current collector 104.

One surface of the cathode 101 is exposed to the atmosphere, and the other surface thereof is in contact with the electrolyte 103. The surface of the anode 102 on the side of the electrolyte 103 is in contact with the electrolyte 103. Note that the electrolyte 103 may be any of electrolytic solution and solid electrolyte. The electrolytic solution is an electrolyte in a liquid form. The solid electrolyte is an electrolyte in a gel form or solid form.

The cathode 101 of the zinc-air battery according to an embodiment of the present invention is constituted by a co-continuous body having a three dimensional network structure formed by an integrated plurality of nanostructures having branches. The co-continuous body is a porous body and has an integrated structure. The nanostructure is a nanosheet or nanofiber. Since the integrated plurality of nanostructures have branches, in the co-continuous body having a three dimensional network structure, the branched portion between the nanostructures is deformable, providing a stretchable structure.

The nanosheet may be constituted by, for example, at least one of carbon, iron oxide, manganese oxide, zinc oxide, molybdenum oxide, and molybdenum sulfide. The elements of these materials may be constituted by any of 22 kinds of elements (C, O, H, N, P, K, S, Ca, Mg, Fe, Mn, B, Zn, Cu, Mo, Cl, Si, Na, Se, Co, Al, and V) indispensable to the growth of plants.

It is important that the nanosheet has electrical conductivity. The nanosheet is a sheet-like substance having a thickness of 1 nm to 1 μm and having planar longitudinal and lateral lengths that are 100 or more times the thickness. As for the nanosheet, examples of the nanosheet made of carbon include graphene. In addition, the nanosheet may be a roll-like sheet or wave-like sheet. The nanosheet may be curved or bent, and may have any shape.

The nanofiber may be constituted by at least one of carbon, iron oxide, manganese oxide, magnesium oxide, molybdenum oxide, molybdenum sulfide, and cellulose (carbonized cellulose). The elements of these materials may be constituted by 16 kinds of essential elements (C, O, H, N, P, K, S, Ca, Mg, Fe, Mn, B, Zn, Cu, Mo, and Cl) indispensable to the growth of plants.

It is important that the nanofiber also has electrical conductivity. The nanofiber is a fibrous substance having a diameter of 1 nm to 1 μm and a length that is 100 or more times the diameter. In addition, the nanofiber may be a hollow fiber or coil-like fiber. The nanofiber may have any shape. Note that cellulose is provided with electrical conductivity by carbonization for use, as will be mentioned later.

For example, the co-continuous body, which forms the cathode 101, is fabricated by at first freezing a sol or gel in which the nanostructure is dispersed to obtain a frozen body (a freezing step); and drying this frozen body in a vacuum (a drying step). A predetermined bacterium can produce a gel in which nanofibers made of any of iron oxide, manganese oxide, silicon and cellulose are dispersed (a gel producing step).

Also, the co-continuous body may be obtained by allowing a predetermined bacterium to produce a gel in which nanofibers made of cellulose are dispersed (a gel production step), and heating and carbonizing this gel in an inert gas atmosphere (a carbonization step).

The co-continuous body forming the cathode 101 has an average pore size of preferably 0.1 to 50 μm, and more preferably 0.1 to 2 μm. Here, the average pore size is a value determined by a mercury press-in method.

For the cathode 101, it is not necessary to use an additional material, such as a binder for a case in which carbon powder is used, and this is advantageous in both cost and environmental conservation.

Here, electrode reactions in the cathode 101 and the anode 102 will be described. Here, as a reaction example, an example using zinc for the anode will be described. When using an n-valent metal anode, there occurs a reaction that releases n electrons.

In the cathode reaction, oxygen in the air and the electrolyte come in contact with each other on the surface of the cathode 101 having electrical conductivity, and thus a reaction indicated by "$\frac{1}{2}O_2 + H_2O + 2e^- \rightarrow 2OH^-$ . . . formula (1)" progresses. On the other hand, in the anode reaction, a reaction "$Zn + 2OH^- \rightarrow Zn(OH)_2 + 2e^-$ . . . formula (2)" progresses in the anode 102 in contact with the electrolyte 103. The metal forming the anode 102 releases electrons and the released electrons are dissolved in the electrolyte 103 as metal ions.

Through these reactions, the metal-air battery 100 can carry out discharge. The overall reaction is "$Zn+H_2O+\frac{1}{2}O_2 \rightarrow Zn(OH)_2 \ldots$ formula (3)", and this reaction produces zinc hydroxide. The nominal voltage is about 1.65 V. The compounds involved in the reactions described above are shown in FIG. 1.

As described above, in the metal-air battery 100, the reaction indicated by the formula (1) progresses on the surface of the cathode 101, and therefore, it is presumably favorable to generate a large amount of reaction sites inside the cathode 101.

The cathode 101 can be fabricated by a publicly known process such as molding carbon powder with a binder. However, as mentioned above, in the metal-air battery, it is important to generate a large amount of reaction sites inside the cathode 101, and it is thus desirable that the cathode 101 should have a large specific surface area. For example, in an embodiment of the present invention, the specific surface area of the co-continuous body constituting the cathode 101 is preferably 200 $m^2/g$ or more, and more preferably 300 $m^2/g$ or more.

When the specific surface area of a conventional cathode fabricated by molding carbon powder with a binder into a pellet is increased, the binding strength between the carbon powder particles is decreased and the structure is deteriorated. This makes stable discharge difficult and the discharge capacity is decreased.

In contrast, the cathode 101 according to an embodiment of the present invention is formed from the co-continuous body having a three dimensional network structure formed by an integrated plurality of nanostructures having branches as mentioned above, the conventional problems mentioned above can be solved and high discharge capacity can be achieved.

Also, the cathode 101 may support a catalyst. The catalyst may be constituted by at least one metal among iron, manganese, zinc, copper, and molybdenum, or a metal oxide formed of at least one metal among calcium, iron, manganese, zinc, copper, and molybdenum. Note that the elements of these materials may be constituted by metals included in 16 kinds of essential elements indispensable to the growth of plants, and may have catalytic ability. As the metal, iron, manganese, and zinc are preferable, and an oxide formed of one of these metals or a complex oxide formed of two or more of these metals is preferable. In addition, manganese oxide ($MnO_2$) is particularly suitable. Manganese oxide exhibits particularly excellent catalytic performance in an embodiment of the present invention.

In addition, it is also preferable that the metal oxide, which is to be the catalyst, should be an amorphous hydrate. For example, the metal oxide, which is to be the catalyst, may be a hydrate of the transition metal oxide mentioned above. More specifically, the metal oxide, which is to be the catalyst, may be a manganese oxide (IV)-n hydrate. Note that n is the number of moles of $H_2O$ based on 1 mol of $MnO_2$. Excellent battery performance can be obtained by allowing the surface of the co-continuous body constituting the cathode 101 to support the manganese oxide hydrate as nanosized fine particles in a highly dispersed state.

For example, excellent battery performance can be exhibited by using, as the cathode 101, the co-continuous body of the cathode 101 onto which a manganese oxide hydrate ($MnO_2 \cdot nH_2O$) is highly dispersed and attached (added) as nanosized fine particles. The content of the catalyst contained in the cathode 101 is 0.1 to 70% by weight, and is preferably 1 to 30% by weight based on the total weight of the cathode 101. The battery performance is greatly improved when a transition metal oxide is added as the catalyst to the cathode 101.

The cathode 101 and the electrolyte 103 come in contact with each other, and an oxygen gas in the atmosphere is supplied at the same time, thereby forming a triphasic interface of electrolyte-electrode-gas (oxygen) as mentioned above. If the catalyst is highly active in this triphasic interface site, oxygen reduction (discharge) on the electrode surface smoothly progresses, and the battery performance is greatly improved. At this time, since the interaction between the catalyst and oxygen, which is the cathode active material, is strong, the catalyst can adsorb many oxygen species onto its surface or can occlude oxygen species in oxygen vacancies.

As described above, the oxygen species adsorbed onto the surface of the metal oxide constituting the catalyst or occluded in the oxygen vacancies are used in an oxygen reduction reaction as the oxygen source (an active intermediate reactant) of the above formula (1), and the above reaction readily progresses. Examples of materials of the catalyst that effectively functions include a metal oxide such as manganese oxide. Instead of the metal oxide, a metal itself can also be used as the catalyst, and the metal functions in the same manner as the above metal oxide.

In the metal-air battery 100, as mentioned above, it is desirable that the reaction sites, which cause the electrode reaction, should be present as many as possible in order to increase the battery efficiency. Specifically, the reaction sites refer to the triphasic portions of electrolyte/electrode/air (oxygen) described above. From such a viewpoint, it is important that a large amount of the triphasic portions mentioned above is also present on the surface of the catalyst, and it is preferable that the specific surface area of the catalyst should be large. The specific surface area of the catalyst made of a metal or metal oxide may be 0.1 to 1,000 $m^2/g$, and preferably 1 to 500 $m^2/g$. Note that the specific surface area is obtained by a publicly known BET method using $N_2$ adsorption.

The cathode 101 to which the catalyst is added can be produced by a method for producing the cathode 101, which will be mentioned later.

Next, the anode 102 will be described. The anode 102 is formed into a foil- or plate-like shape formed of a metal. The anode 102 is constituted by an anode active material. This anode active material is not particularly limited as long as it is a material that can be used as an anode material of metal-air batteries, specifically, any metal among magnesium, aluminum, calcium, iron, and zinc or an alloy containing these metals as the main component. For example, the anode 102 may be constituted by a material obtained by bonding a metal, metal sheet or powder, which is to be the anode, to a metal foil such as a copper foil with pressure.

The anode 102 can be formed by a publicly known method. For example, when a magnesium metal is used as the anode 102, the anode 102 can be fabricated by piling up a plurality of metal magnesium foils and forming the piled foils into a predetermined shape.

Next, the electrolyte 103 will be described. The electrolyte 103 may be a substance through which metal ions and hydroxide ions can move between the cathode 101 and the anode 102. Examples of the electrolyte 103 may include an aqueous solution constituted by a metal salt containing potassium or sodium, existing abundantly on the earth. Note that this metal salt may be constituted by 22 kinds of elements (any of C, O, H, N, P, K, S, Ca, Mg, Fe, Mn, B, Zn, Cu, Mo, Cl, Si, Na, Se, Co, Al, and V) indispensable to the growth of plants, or elements contained in sea water, rain water, or hot springs. The electrolyte 103 may be constituted by, for example, any of acetic acid, carbonic acid, citric acid, malic acid, oxalic acid, phosphoric acid, or a salt thereof, HEPES (4-(2-hydroxyethyl)-1-piperazineethanesulfonic acid), a pyrophosphate, and a metaphosphate. Citric acid, malic acid, and oxalic acid are used as fertilizers. They work by forming complexes with phosphorus, which is one of the most abundant elements in the fertilizer components, to promote phosphorus absorption by plants. Therefore, it is particularly preferable to use citric acid, malic acid, oxalic acid, or a salt formed therefrom as the electrolyte 103 because they not only exert no influence even when the electrolyte leaks out into soil, but also function as a fertilizer.

In addition, as another material constituting the electrolyte 103, an aromatic anion exchange polymer solid electrolyte or inorganic laminar compound based solid electrolyte, having ionic conductivity by which metal ions and hydroxide ions pass through the electrolyte, may be used.

Next, the current collector 104 will be described. The current collector 104 is formed into a foil- or plate-like shape formed of a metal. The current collector 104 is arranged outside the cathode 101, and preferably has excellent electrical conductivity and flexibility. The current collector 104 may be constituted by, for example, a cloth, felt, mesh, foil, or plate formed of any of carbon, copper, aluminum, zinc, iron, and calcium, or a mixture thereof.

In addition, these current collectors 104 may be equipped with an electrically conductive unit and an air intake unit. For example, when a breathable carbon cloth is used as the current collector 104, the electrical conductivity between the cloths can be improved by fusing a biodegradable resin, and air can be taken in at the part that is not fused. Alternatively, when a non-breathable metal foil such as aluminum foil is used as the current collector 104, since it has sufficient electrical conductivity, it can be used as the current collector 104 for the cathode 101 by providing an open hole using a drill or the like at the part in contact with the cathode to create the air intake part.

A housing 105 of the metal-air battery 100 may be constituted by a naturally degradable material. The housing 105 may be made from any of a natural product based material, a microorganism based material, and a chemosynthetic material. For example, the housing 105 can be constituted by any of a polylactic acid, a polycaprolactone, a polyhydroxyalkanoate, a polyglycolic acid, a modified polyvinyl alcohol, a casein, a modified starch, and the like. A chemosynthetic material such as a polylactic acid derived from plants is particularly favorable. Also, the shape of the housing 105 is not limited as long as it is a shape that can be obtained by processing a biodegradable resin (manufactured by MIYOSHI OIL & FAT CO., LTD., thickness: 0.2 mm), but it is preferable that the housing should have an open hole so as not to block the air intake unit 201b that the current collector 104 has. One example of the material applicable to the housing 105 is a commercially available biodegradable resin film. In addition, a paper on which a coating film of a resin such as a polyethylene is formed, used for a milk pack and the like, and an agar film can also be used.

Note that, in addition to the configuration described above, the metal-air battery 100 can include a structural member such as any one of a separator, a battery case, and a metal foil (for example, a copper foil), and an element required for general metal-air batteries. For these members and elements, those that are conventionally and publicly known can be used. The separator is not particularly limited as long as it is a fibrous material, but a cellulose based separator made from plant fibers or bacteria is particularly preferable. The separator absorbs a liquid, which is to be an electrolytic solution.

Also, the metal-air battery 100 according to an embodiment of the present invention has a wound structure in which the current collector 104, the cathode 101, the separator, the anode 102, and the separator are superimposed and wound in this order.

Next, a production method will be described. The metal-air battery 100 according to an embodiment of the present invention can be fabricated by appropriately arranging the cathode 101, the anode 102, and the electrolyte 103, together with other necessary elements based on the structure of a desired metal-air battery, in an appropriate container such as a case. The cathode 101 can be obtained by a method for producing a cathode, which will be mentioned later. For these production procedures for the metal-air battery 100, a conventionally known method can be applied.

Hereinafter, fabrication of the cathode 101 will be described.

Production Method 1

Figure 2:
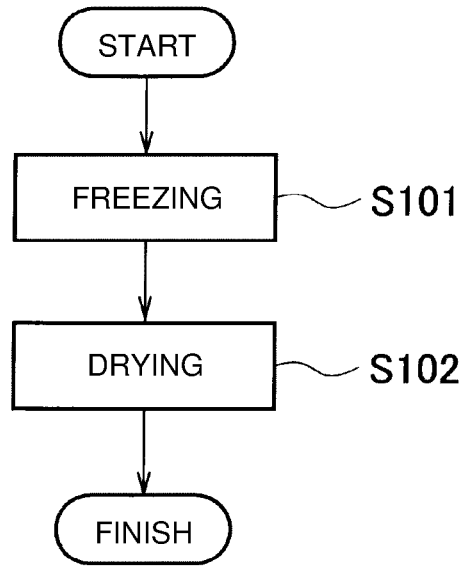
FIG. 2 is a flowchart for explaining a production method 1 according to an embodiment of the present invention.

At first, a production method 1 will be described with reference to FIG. 2. FIG. 2 is a flow chart for explaining the production method 1.

At first, in step S101, a sol or gel in which a nanostructure such as a nanosheet or a nanofiber is dispersed is frozen to obtain a frozen body (a freezing step). Next, in step S102, the obtained frozen body is dried in a vacuum to obtain a co-continuous body (a drying step).

Hereinafter, more detailed description will be given for each step. The freezing step of step S101 is a step of maintaining or constructing a three dimensional network structure by using a plurality of nanostructures integrated through a noncovalent bond. In the subsequent drying step, the nanostructures will become a stretchable co-continuous body that has been made to have a three dimensional network structure.

Here, the gel means a solid dispersion medium having lost fluidity due to the three dimensional network structure of the nanostructures, which are the dispersoids. Specifically, the gel means a dispersion system having a shear elastic modulus of $10^2$ to $10^6$ Pa. The dispersion medium of the gel may be an aqueous medium such as water ($H_2O$), or an organic medium such as a carboxylic acid, methanol ($CH_3OH$), ethanol ($C_2H_5OH$), propanol ($C_3H_7OH$), n-butanol, isobutanol, n-butylamine, dodecane, an unsaturated fatty acid, ethylene glycol, heptane, hexadecane, isoamyl alcohol, octanol, isopropanol, acetone or glycerin, and two or more kinds thereof may be mixed.

Next, the sol means a colloid formed of a dispersion medium and the nanostructures, which are the dispersoids. Specifically, the sol means a dispersion system having a shear elastic modulus of 1 Pa or less. The dispersion medium of the sol may be an aqueous medium such as water, or an organic medium such as a carboxylic acid, methanol, ethanol, propanol, n-butanol, isobutanol, n-butylamine, dodecane, an unsaturated fatty acid, ethylene glycol, heptane, hexadecane, isoamyl alcohol, octanol, isopropanol, acetone or glycerin, and two or more kinds thereof may be mixed.

The freezing step is performed by, for example, accommodating the sol or gel in which the nanostructures are dispersed in an appropriate container such as a test tube, and cooling the surrounding of the test tube in a coolant such as liquid nitrogen, thereby freezing the sol or gel accommodated in the test tube. The approach of freezing is not particularly limited as long as the dispersion medium of the gel or sol can be cooled to the freezing point or lower, and the dispersion medium may also be cooled with a freezer or the like.

By freezing the gel or sol, the dispersion medium loses fluidity and the dispersoids are fixed, thereby constructing the three dimensional network structure. Also, in the freezing step, the specific surface area can be adjusted freely by adjusting the concentration of the gel or sol, and the specific surface area of the obtained co-continuous body is increased as the concentration of the gel or sol is decreased. If the concentration becomes 0.01% by weight or less, however, it becomes difficult for the dispersoids to construct the three dimensional network structure. Therefore, it is suitable that the concentration of the dispersoids should be 0.01 to 10% by weight.

By constructing the three dimensional network structure having a large specific surface area with the nanostructures such as nanofibers or nanosheets, the nanofibers or nanosheets have excellent stretchability when compressed or extended because the pores play the role of a cushion. Specifically, the co-continuous body desirably has a distortion of 5% or more, and more desirably 10% or more at the elastic limit.

If the dispersoids are not fixed by freezing, the dispersoids are aggregated along with the evaporation of the dispersion medium in the subsequent drying step, and therefore, a sufficiently high specific surface area cannot be obtained and it becomes difficult to fabricate the co-continuous body having the three dimensional network structure.

Next, the drying step of step S102 will be described. The drying step is a step of, from the frozen body obtained in the freezing step, taking the dispersoids (a plurality of microstructures that have been integrated) maintaining or constructing the three dimensional network structure out of the dispersion medium.

In the drying step, the frozen body obtained in the freezing step is dried in a vacuum, thereby sublimating the frozen dispersion medium from the solid state. For example, the drying step is performed by accommodating the obtained frozen body in an appropriate container such as a flask, and evacuating the inside of the container. Since the frozen body is placed in the vacuum atmosphere, the sublimation point of the dispersion medium is lowered, and this allows even a substance that is not sublimated at ordinary pressure to be sublimated.

The degree of vacuum in the drying step varies depending on the dispersion medium to be used, and is not particularly limited as long as it enables sublimation of the dispersion medium. For example, when water is used as the dispersion medium, the degree of vacuum must be set such that the pressure is 0.06 MPa or less, but the drying time is prolonged because heat is deprived of as latent heat of sublimation. For this reason, it is suitable that the degree of vacuum should be $1.0 \times 10^{-6}$ to $1.0 \times 10^{-2}$ Pa. Furthermore, upon the drying, heat may also be applied by using a heater or the like.

In a method for performing drying in the atmosphere, the state of the dispersion medium is changed from solid to liquid, and subsequently from liquid to gaseous, and therefore, the frozen body is changed into a liquid state and becomes fluidic again in the dispersion medium, thereby demolishing the three dimensional network structure of a plurality of nanostructures. For this reason, it is difficult for the drying in the atmospheric pressure atmosphere to fabricate a stretchable co-continuous body.

Production Method 2 (Bacterium)

Figure 3:
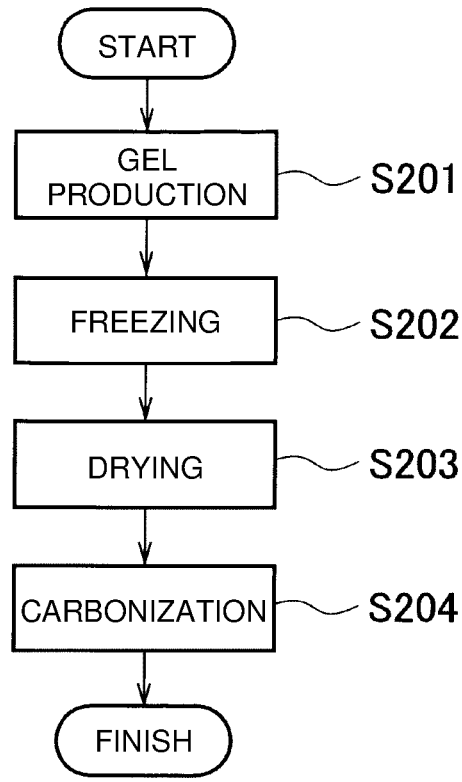
FIG. 3 is a flowchart for explaining a production method 2 according to an embodiment of the present invention.

Next, a production method 2 will be described with reference to FIG. 3. FIG. 3 is a flow chart for describing the production method 2.

At first, in step S201, a gel in which nanofibers made of iron oxide, manganese oxide or cellulose are dispersed is produced by a predetermined bacterium (a gel producing step). By using the gel thus obtained, a co-continuous body is fabricated.

The gel produced by a bacterium has a nm-order fiber as a basic structure, and by using this gel to fabricate a co-continuous body, the co-continuous body to be obtained will have a large specific surface area. As mentioned above, it is desirable that the cathode 101 of the metal-air battery 100 should have a large specific surface area, and therefore, it is suitable to use the gel produced by a bacterium. Specifically, by using the gel produced by a bacterium, a cathode (co-continuous body) having a specific surface area of 300 $m^2/g$ or more can be synthesized.

The gel produced by a bacterium has a structure in which fibers get entangled into the form of a coil or mesh, and further has a structure in which nanofibers branch based on the proliferation of the bacterium. Therefore, in a co-continuous body that can be fabricated, excellent stretchability with a distortion of 50% or more at the elastic limit is accomplished. Accordingly, a co-continuous body fabricated by using the gel produced by a bacterium is suitable for the cathode 101 of the metal-air battery 100.

As the gel produced by a bacterium, two or more of bacterial cellulose, iron oxide and manganese oxide may be mixed.

Examples of the bacterium include those publicly known, and it may be, for example, an *Acetobacter* such as *Acetobacter xylinum* subspecies *sucrofermentans*, *Acetobacter xylinum* ATCC23768, *Acetobacter xylinum* ATCC23769, *Acetobacter pasteurianus* ATCC10245, *Acetobacter xylinum* ATCC14851, *Acetobacter xylinum* ATCC11142 and *Acetobacter xylinum* ATCC10821, *Agrobacterium*, *Rhizobium*, *Sarcina*, *Pseudomonas*, *Achromobacter*, *Alcaligenes*, *Aerobacter*, *Azotobacter*, *Zooglea*, *Enterobacter*, *Kluyvera*, *Leptothrix*, *Gallionella*, *Siderocapsa*, *Thiobacillus*, and those produced by culturing various mutant strains created by subjecting the above bacteria to a mutation treatment by a publicly known method using NTG (nitrosoguanidine) or the like.

As a method in which a co-continuous body is obtained by using a gel produced by the bacterium mentioned above, in the same manner as the production method 1, a frozen body may be obtained by freezing the gel in step S202 (a freezing step) and the frozen body may be dried in a vacuum to obtain a co-continuous body in step S203 (a drying step).

However, the bacterial cellulose, which is a component contained in the gel produced by a bacterium, has no electrical conductivity. Therefore, when using it as the cathode 101, the carbonization step (step S204) of carbonizing the co-continuous body by subjecting it to a heat treatment in an inert gas atmosphere, thereby imparting electrical conductivity is important. The co-continuous body thus carbonized has high electrical conductivity, corrosion resistance, high stretchability, large specific surface area, and high catalytic activity, and hence is suitable as the cathode 101 of the metal-air battery 100.

In carbonization of a bacterial cellulose, the carbonization may be performed by synthesizing a co-continuous body having a three dimensional network structure formed of the bacterial cellulose in the freezing step and drying step mentioned above, and subsequently calcining the co-continuous body in an inert gas atmosphere at 500° C. to 2000° C., and more preferably 900° C. to 1800° C. The gas that does not burn the cellulose may be an inert gas such as nitrogen gas or argon gas. Alternatively, the gas may be a reducing gas such as hydrogen gas or carbon monoxide gas, or may be carbon dioxide gas. In an embodiment of the present invention, it is more preferable to use carbon dioxide gas or inert gas containing carbon dioxide gas, which has an activation effect to a carbon material and is expectedly capable of highly activating the co-continuous body.

Production Method 3 (Catalyst)

Figure 4:
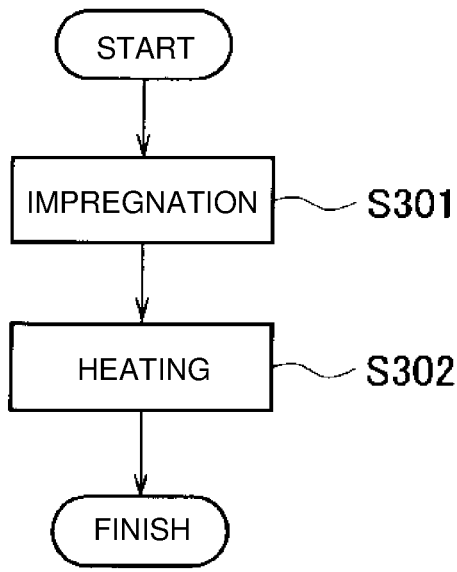
FIG. 4 is a flowchart for explaining a production method 3 according to an embodiment of the present invention.

Next, a production method 3 will be described with reference to FIG. 4. FIG. 4 is a flow chart for describing the production method 3. As mentioned above, a catalyst may be supported on the cathode 101. In step S301, the co-continuous body obtained by the production method 1 or production method 2 mentioned above is impregnated with an aqueous solution of a metal salt, which is to be a precursor of a catalyst (an impregnation step). A stretchable co-continuous body containing the metal salt is prepared as described above, and then, the stretchable co-continuous body containing the metal salt may be subjected to a heating treatment in step S302 (a heating step). Note that the metal in the metal salt to be used is preferably at least one metal selected from the group consisting of iron, manganese, zinc, copper and molybdenum. Manganese is particularly preferable.

In order to allow the co-continuous body to support a transition metal oxide, a conventionally known method can be used. For example, mention may be made of a method in which the co-continuous body is impregnated with an aqueous solution of a transition metal chloride or transition metal nitrate, the solution is evaporated to dryness, and the co-continuous body is then subjected to hydrothermal synthesis in water ($H_2O$) at high temperature and high pressure. Mention may also be made of a sedimentation method in which the co-continuous body is impregnated with an aqueous solution of a transition metal chloride or transition metal nitrate and an aqueous alkaline solution is dropped thereonto. In addition, mention may also be made of a sol-gel method in which the co-continuous body is impregnated with a transition metal alkoxide solution and then subjected to hydrolysis. The conditions for each of these liquid phase methods are publicly known, and these publicly known conditions can be applied. In an embodiment of the present invention, the liquid phase methods are desirable.

A metal oxide to be supported according to the liquid phase methods described above is in an amorphous state in many cases because crystallization has not progressed. By subjecting the amorphous precursor to a heat treatment at a high temperature of about 500° C. in an inert atmosphere, a crystalline metal oxide can be obtained. Such a crystalline metal oxide exhibits high performance even when used as the catalyst on the cathode 101.

On the other hand, precursor powder to be obtained when drying the amorphous precursor described above at a relatively low temperature of about 100 to 200° C. is in a hydrate state while maintaining the amorphous state. The hydrate of the metal oxide can be formally represented by $Me_xO_y \cdot nH_2O$. Here, Me denotes any of the above metals; x and y represent the number of metals and the number of oxygens contained in the metal oxide molecule, respectively; and n is the number of moles of $H_2O$ based on 1 mol of the metal oxide. The hydrate of the metal oxide obtained by such low temperature drying can be used as the catalyst.

The amorphous metal oxide (hydrate) has hardly been sintered, and hence has a large surface area and exhibits a very small particle size of about 30 nm. The amorphous metal oxide is suitable as the catalyst, and by using the amorphous metal oxide, excellent battery performance can be obtained.

As mentioned above, a crystalline metal oxide exhibits high activity, but for the metal oxide that has been crystallized through a heat treatment at a high temperature as described above, the surface area thereof may be reduced significantly and the particle size thereof may also become about 100 nm due to aggregation of the particles. Note that this particle size (average particle size) is a value obtained by measuring the diameters of particles in a 10 μm square area (10 μm×10 μm) by observing the particles in an enlarged scale using a scanning electron microscope (SEM) or the like, and calculating the average value thereof.

Also, especially in a catalyst made of a metal oxide that has been subjected to a heat treatment at a high temperature, the particles are aggregated, and therefore, it may be difficult to add the catalyst onto the surface of the co-continuous body in a highly dispersed state. In order to obtain a sufficient catalytic effect, it may be necessary to add a large amount of the metal oxide into the cathode (co-continuous body), and it may be disadvantageous in cost to fabricate the catalyst through a heat treatment at a high temperature.

In order to solve this problem, the following production method 4, production method 5 and production method 6 may be used.

Production Method 4 (Catalyst)

Figure 5:
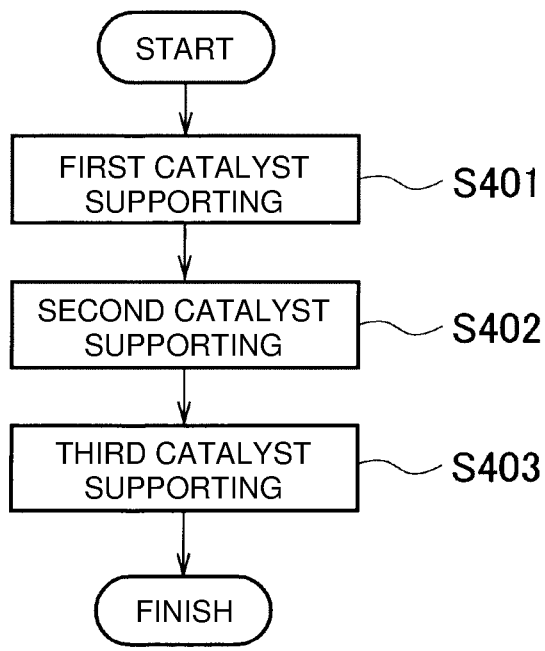
FIG. 5 is a flowchart for explaining a production methods 4, 5 and 6 according to an embodiment of the present invention.

Next, a production method 4 will be described with reference to FIG. 5. FIG. 5 is a flow chart for describing the production methods 4, 5 and 6.

In the production method 4, the co-continuous body fabricated as described in the production method 1 and the production method 2 is allowed to support a catalyst. In the production method 4, in addition to the production of the co-continuous body mentioned above, the following catalyst supporting step is added in which the co-continuous body is allowed to support a catalyst.

At first, in a first catalyst supporting step of step S401, the co-continuous body is immersed in an aqueous solution of a surfactant to attach the surfactant on the surface of the co-continuous body.

Next, in a second catalyst supporting step of step S402, by using an aqueous solution of a metal salt, on the surface of the co-continuous body on which the surfactant has been attached, the metal salt is attached via the surfactant.

Next, in a third catalyst supporting step of step S403, through a heat treatment for the co-continuous body to which the metal salt has been attached, the co-continuous body is allowed to support a catalyst formed of the metal constituting the metal salt or an oxide of the metal.

Note that the metal described above is at least one metal among iron, manganese, zinc, copper, and molybdenum, or a metal oxide formed of at least one metal among calcium, iron, manganese, zinc, copper, and molybdenum. Manganese (Mn) or manganese oxide ($MnO_2$) is particularly preferable.

The surfactant to be used in the first catalyst supporting step of the production method 4 is for allowing the cathode 101 (co-continuous body) to support a metal or transition metal oxide thereon in a highly dispersed state. As long as a molecule has a hydrophobic group that is adsorbed onto the carbon surface and a hydrophilic group that adsorbs transition metal ions, like the surfactant, metal ions as the transition metal oxide precursor are allowed to be adsorbed onto the co-continuous body in a highly dispersed state.

The surfactant mentioned above is not particularly limited as long as a molecule has a hydrophobic group that is adsorbed onto the carbon surface and a hydrophilic group that adsorbs manganese ions, but a nonionic surfactant is preferable. For example, as an ester type surfactant, mention may be made of glycerin laurate, glycerin monostearate, sorbitan fatty acid ester, sucrose fatty acid ester and the like. In addition, as an ether type surfactant, mention may be made of polyoxyethylene alkyl ether, polyoxyethylene alkylphenyl ether, polyoxyethylene polyoxypropylene glycol and the like.

Moreover, as an ester ether type surfactant, mention may be made of polyoxyethylene sorbitan fatty acid ester, polyoxyethylene hexytan fatty acid ester, sorbitan fatty acid ester polyethylene glycol and the like. In addition, as an alkanol amide type surfactant, mention may be made of lauric acid diethanolamide, oleic acid diethanolamide, stearic acid diethanolamide, cocamide DEA, and the like. Also, as a higher alcohol surfactant, mention may be made of cetanol, stearyl alcohol, oleyl alcohol and the like. Furthermore, as a poloxamer type surfactant, mention may be made of poloxamer dimethacrylate and the like.

The concentration of the aqueous surfactant solution in the first catalyst supporting step of the production method 4 is preferably 0.1 to 20 g/L. In addition, the immersion conditions such as the immersion time and immersion temperature include, for example, immersing the co-continuous body in a solution at room temperature to 50° C. for 1 to 48 hours.

The second catalyst supporting step of the production method 4 includes further dissolving a metal salt that functions as a catalyst in the aqueous solution containing the surfactant in the first catalyst supporting step, or adding an aqueous solution of the metal salt thereto. Alternatively, apart from the aqueous solution containing the surfactant mentioned above, an aqueous solution in which a metal salt that functions as a catalyst is dissolved may be prepared, and the co-continuous body impregnated with the surfactant (to which the surfactant has been attached) may be immersed in this solution.

Also, the co-continuous body to which the surfactant has been attached may be impregnated with an aqueous solution in which a metal salt is dissolved. As necessary, an aqueous alkaline solution may be dropped on the obtained co-continuous body containing the metal salt (to which the metal salt has been attached). By doing these, the metal or metal oxide precursor can be attached to the co-continuous body.

It is preferable that the amount of the metal salt added in the second catalyst supporting step of the production method 4 should be 0.1 to 100 mmol/L. In addition, the immersion conditions such as the immersion time and immersion temperature include, for example, immersing the co-continuous body in a solution at room temperature to 50° C. for 1 to 48 hours.

More specifically, if explanation is given by taking manganese as an example of the metal, for example, a manganese metal salt (for example, a manganese halide such as manganese chloride or its hydrate) is added to an aqueous solution that contains the surfactant and with which the co-continuous body is impregnated. Subsequently, by dropping an aqueous alkaline solution on the obtained co-continuous body containing the manganese metal salt, manganese hydroxide as a metal or metal oxide precursor is allowed to be supported on the co-continuous body.

The amount of the above-mentioned catalyst made of manganese oxide to be supported can be adjusted by the concentration of the metal salt (for example, manganese chloride) in the aqueous metal salt solution.

In addition, examples of the alkali to be used in the aqueous alkaline solution mentioned above may include a hydroxide of an alkali metal or alkali earth metal, aqueous ammonia, an aqueous ammonium solution, and an aqueous tetramethylammonium hydroxide (TMAH) solution. It is preferable that the concentration of these aqueous alkaline solutions should be 0.1 to 10 mol/L.

In the third catalyst supporting step in the production method 4, the metal or metal oxide precursor (metal salt), which has been attached to the surface of the co-continuous body, is converted into the metal itself or the metal oxide through a heat treatment.

Specifically, the co-continuous body to which the precursor has been attached may be dried at room temperature (about 25° C.) to 150° C., and more preferably 50° C. to 100° C. for 1 to 24 hours, and then subjected to a heat treatment at 100 to 600° C., and preferably 110 to 300° C.

In the third catalyst supporting step in the production method 4, by subjecting the co-continuous body to a heat treatment in an inert atmosphere such as argon, helium and nitrogen or in a reducing atmosphere, a cathode 101 made of a co-continuous body, to the surface of which the metal itself is attached as a catalyst, can be produced. Also, a cathode 101 made of a co-continuous body, to the surface of which the metal oxide is attached as a catalyst, can be produced by subjecting the co-continuous body to a heat treatment in gas containing an oxygen (oxidizing atmosphere).

Also, by subjecting the co-continuous body to a heat treatment under the reducing conditions mentioned above, a co-continuous body to which the metal itself is attached as a catalyst is once fabricated, and then by subjecting this to a heat treatment in an oxidizing atmosphere, a cathode 101 made of a co-continuous body to which the metal oxide is attached as a catalyst can be produced.

As an alternative method, by drying the co-continuous body to which the metal or metal oxide precursor (metal salt) has been attached at room temperature to 150° C., more preferably 50° C. to 100° C., allowing the metal itself to be attached onto the co-continuous body as a catalyst, a metal/co-continuous body composite may be fabricated.

In the production method 4, the amount (content) of the attached catalyst made of the metal or metal oxide is 0.1 to 70% by weight, and is preferably 1 to 30% by weight based on the total weight of the co-continuous body and the catalyst.

According to the production method 4, a cathode 101 in which the catalyst made of the metal or metal oxide is highly dispersed on the surface of the co-continuous body can be produced, and a metal-air battery 100 with excellent battery characteristics can be configured.

Production Method 5 (Catalyst)

Next, a production method 5 will be described with reference to FIG. 5. In the production method 5, the co-continuous body fabricated as described in the production method 1 or the production method 2 is allowed to support a catalyst according to a method different from the production method 4 mentioned above. In the production method 5, in addition to the production of the co-continuous body mentioned above, the following catalyst supporting step is added in which the co-continuous body is allowed to support a catalyst.

At first, in a first catalyst supporting step of step S401, by immersing the co-continuous body in an aqueous solution of a metal salt, the metal salt is attached to the surface of the co-continuous body.

Next, in a second catalyst supporting step of step S402, through a heat treatment for the co-continuous body to which the metal salt has been attached, the co-continuous body is allowed to support a catalyst formed of the metal constituting the metal salt.

Next, in a third catalyst supporting step, by subjecting the co-continuous body on which the catalyst is supported to water at high temperature and high pressure, the catalyst is changed into a metal oxide hydrate.

Note that the metal described above is at least one metal among iron, manganese, zinc, copper, and molybdenum, or a metal oxide formed of at least one metal among calcium, iron, manganese, zinc, copper, and molybdenum. Manganese or manganese oxide ($MnO_2$) is particularly preferable.

In the first catalyst supporting step in the production method 5, an aqueous solution of a metal salt, a metal or metal oxide precursor, which is ultimately to be a catalyst, is allowed to be attached (supported) on the surface of the co-continuous body. For example, an aqueous solution in which the metal salt described above is dissolved may be separately prepared, and the co-continuous body may be impregnated with this aqueous solution. The impregnation conditions and the like are the same as the conventional conditions as mentioned above.

The second catalyst supporting step in the production method 5 is the same as the third catalyst supporting step of the production method 4, and a heating treatment may be performed in an inert atmosphere or reducing atmosphere. Also, as described as the alternative method of the third catalyst supporting step of the production method 4, by subjecting the co-continuous body to which the precursor has been attached to a heating treatment (drying) at low temperature (room temperature to 150° C., more preferably 50° C. to 100° C.), the metal may be attached to the co-continuous body.

The cathode 101 using a metal itself as a catalyst exhibits high activity, but may be weak against corrosion lack long term stability because the catalyst is a metal. In contrast, by changing the metal into a metal oxide hydrate through a heating treatment according to a third catalyst supporting step of the production method 5, which will be described in detail below, long term stability can be achieved.

Next, in the third catalyst supporting step of step S403 in the production method 5, the metal oxide hydrate is attached to the co-continuous body. Specifically, the co-continuous body obtained in the second catalyst supporting step of the production method 5, to which the metal has been attached, is immersed in water at high temperature and high pressure, thereby converting the attached metal into a catalyst formed of the metal oxide hydrate.

For example, the co-continuous body, to which the metal has been attached, may be immersed in water at 100° C. to 250° C., and more preferably 150° C. to 200° C., thereby oxidizing the attached metal into the metal oxide hydrate.

Since the boiling point of water at atmospheric pressure (0.1 MPa) is 100° C., normally, nothing can be immersed in water at 100° C. or higher at atmospheric pressure. However, by using a predetermined airtight container and elevating the internal pressure of this airtight container to, for example, 10 to 50 MPa, and preferably about 25 MPa, the boiling point of water rises in the airtight container, and liquid water at 100° C. to 250° C. can be achieved. When the co-continuous body to which the metal has been attached is immersed in the water at high temperature thus obtained, the metal can be changed into the metal oxide hydrate.

Production Method 6 (Catalyst)

Next, a production method 6 will be described. In the production method 6, the co-continuous body fabricated as described in the production method 1 or the production method 2 is allowed to support a catalyst according to a method different from the production methods 4 and 5 mentioned above. In the production method 6, in addition to the production of the co-continuous body mentioned above, the following catalyst supporting step is added in which the co-continuous body is allowed to support a catalyst. Note that the production method 6 is only up to the second catalyst supporting step and there is no third catalyst supporting step.

At first, in a first catalyst supporting step of step S401, by immersing the co-continuous body in an aqueous solution of a metal salt, the metal salt is attached to the surface of the co-continuous body.

Next, in a second catalyst supporting step of step S402, by subjecting the co-continuous body to which the metal salt has been attached to water at high temperature and high pressure, the co-continuous body is allowed to support a catalyst formed of a metal oxide hydrate made of the metal constituting the metal salt.

Note that the metal described above may be at least one metal among iron, manganese, zinc, copper, and molybdenum.

The first catalyst supporting step in the production method 6 is the same as the first catalyst supporting step in the production method 5, and description will thus be omitted.

In the second catalyst supporting step in the production method 6, the precursor (metal salt) that has been attached to the surface of the co-continuous body is converted into the metal oxide hydrate through a heat treatment at a relatively low temperature.

Specifically, the co-continuous body, to which the precursor has been attached, is subjected to water at high temperature and high pressure, and then dried at a relatively low temperature of about 100 to 200° C. Consequently, the precursor is changed into a hydrate in which water molecules are present in particles, while maintaining the amorphous state of the precursor. The metal oxide hydrate obtained by such drying at low temperature is used as a catalyst.

In a cathode 101 fabricated according to the production method 6, the metal oxide hydrate can be supported in a highly dispersed state on the co-continuous body as nano-sized fine particles. Accordingly, when such a co-continuous body is used as a cathode 101, excellent battery performance can be exhibited.

The co-continuous body obtained by each of the production methods described above can be molded into a predetermined shape by a publicly known procedure for use as the cathode 101.

Production Method 7 (Current Collector)

Figure 6:
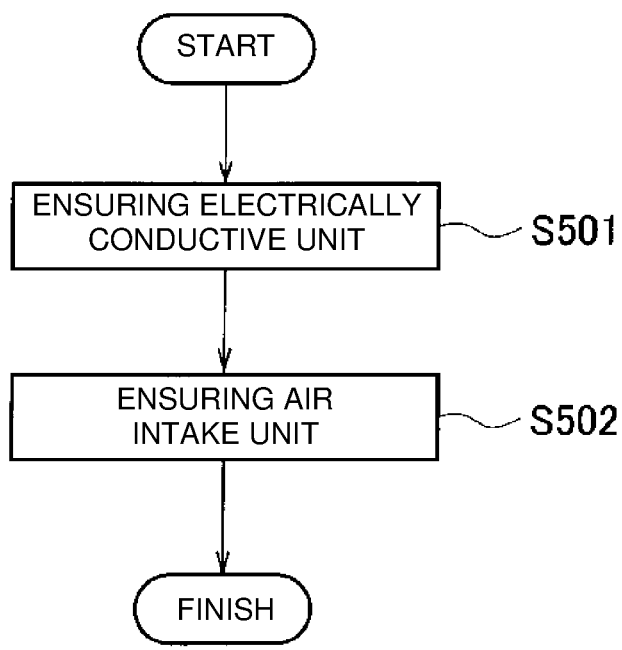
FIG. 6 is a flowchart for explaining a production method 7 according to an embodiment of the present invention.

Next, a production method 7 will be described with reference to FIG. 6. FIG. 6 is a flow chart for explaining the production method 7.

At first, in step S501, the current collector 104 has an electrically conductive unit 201a. For example, when using a material such as a carbon cloth, which has many voids inside the electrical conductor and high resistance among the current collector, the conductive path inside the current collector can be secured and the electrical conductivity can be improved by solidifying, for example by thermally fusing, the part not in contact with the cathode 101 and the circumference of the surface in contact with the cathode 101 with a biodegradable resin. For the thermal bonding, a commercially available heat sealer, heat press, or heat laminating machine can be used. The biodegradable resin may be made from any of a natural product based material, a microorganism based material, and a chemosynthetic material. For example, the biodegradable resin can be constituted by a polylactic acid, a polycaprolactone, a polyhydroxyalkanoate, a polyglycolic acid, a modified polyvinyl alcohol, a casein, a modified starch, or the like. A chemosynthetic material such as a polylactic acid derived from plants is particularly favorable. The thermal fusion may be performed by adhering for about 5 to 30 seconds at a temperature of 100° C. to 300° C., preferably 150° C. to 200, and the pressure may be applied at 0.1 to 2.0 MPa, preferably 1.0 MPa. Here, the temperature at which the thermal fusion is performed is preferably about 10° C. above the melting point temperature of the biodegradable resin used for the thermal fusion. However, when using a current collector with high electrical conductivity such as a metal foil, this step can be omitted.

Next, in step S502, the current collector 104 is provided with an air intake unit 201b as an air intake port. Of the current collector 104, the part that is not formed as the electrically conductive unit 201a serves as the air intake unit 201b. As mentioned above, when using a material having many voids, such as a carbon cloth, as the current collector 104, this step can be omitted because that electrical conductor is capable of taking in air. However, when a current collector without voids, such as a metal foil, is used as the current collector 104, it is difficult to take in air and there is not enough oxygen for the reaction at the cathode 101, and therefore, an open hole for air intake can be provided as the air intake unit 201b using a drill, cutter or the like.

Production Method 8(How to Wind)

Figure 7:
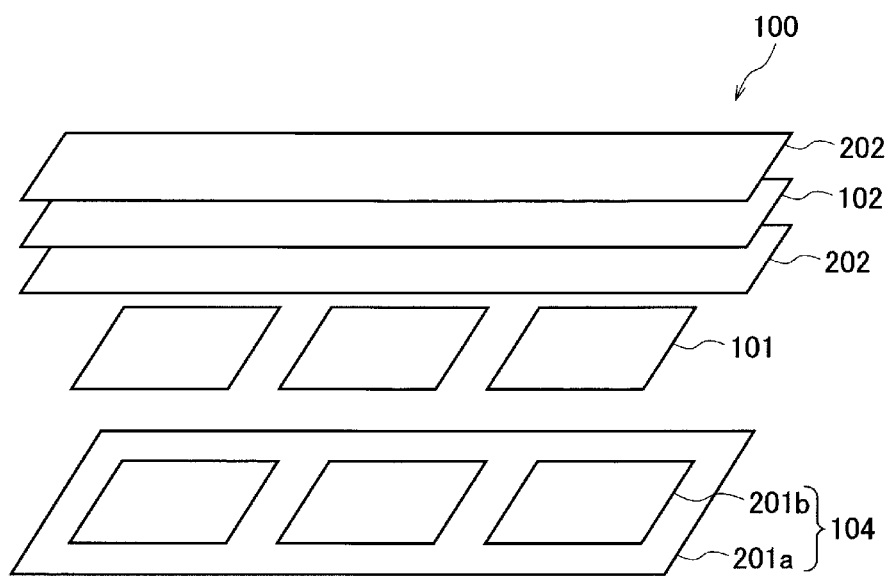
FIG. 7 is a constitutional view illustrating the configuration of a zinc-air battery with a wound structure according to the form of Example 7 of the present invention.

Next, a production method 8 will be described with reference to FIG. 7. FIG. 7 is for describing the production method 8.

In the production method 8, a battery with a wound structure is fabricated using the cathode 101, which is a co-continuous body supporting a catalyst as described up to the production method 6, and the current collector 104 as described in the production method 7.

At first, a cathode 101 produced by the above-described production method 1 or 2 is allowed to contain a volatile liquid that does not alter the structure of the cathode 101. Subsequently, a foil- or plate-like current collector 104 formed of a metal, the cathode 101, a separator 202 that absorbs a liquid, which is to be an electrolytic solution, a foil- or plate-like anode 102 formed of a metal, and the separator 202 are superimposed and wound in this order to form a wound structure.

Specifically, at first, the cathode 101, which is a co-continuous body, is arranged on the current collector 104 with an electrically conductive unit 201a and an air intake unit 201b, produced according to the production method 7. Here, the cathode 101 is allowed to sufficiently absorb ethanol as the volatile solvent, and is pressed down with an instrument that has a flat surface larger than the cathode 101, such as a ceramic plate, to eliminate the thickness and stretchability of the cathode 101. Then, the anode 102 sandwiched by the separator 202 is arranged thereon to complete a battery before winding. This battery is wound from the end, and the wound battery can be finally fixed by placing it inside a tube or ring fabricated with a biodegradable resin.

Lastly, the battery is dried until the stretchability of the cathode 101 returns, and the metal-air battery 100 with a wound structure can be obtained.

The co-continuous body obtained by each of the production methods described above can be molded into a predetermined shape by a publicly known procedure for use as a cathode. For example, a co-continuous body that has not supported a catalyst yet or that has supported a catalyst may be processed into the form of a plate, sheet, or powder, and arranged on and pressure-bonded to the current collector 104, thereby obtaining a cathode.

Figure 8:
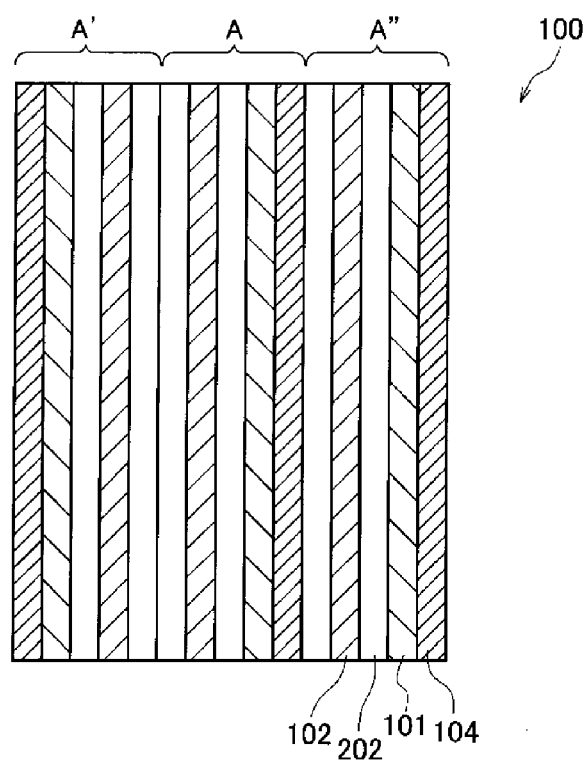
FIG. 8 is a constitutional view illustrating the configuration of a cross section of a zinc-air battery according to Example 7 of the present invention.

Hereinafter, more detailed description will be given using Examples. At first, the configuration of a battery that was actually used will be described with reference to FIG. 8. FIG. 8 is a cross-sectional view illustrating a configuration example of a zinc-air battery with a wound structure. Note that a cross-sectional view of a single winding is illustrated to make it easier to see, but in reality, the number of winding turns varies depending on the size of the battery components to be prepared. FIG. 8 is a cross-sectional view of a battery when it is wound counterclockwise around A in the order of A→A'→A" as seen from the top of FIG. 8.

As illustrated in FIG. 8, the battery with a wound structure has a current collector 104, a cathode 101, a separator 202, and an anode 102. The cathode 101 is provided with the current collector 104, which is formed of an electrically conductive unit 201a and an air intake unit 201b, as illustrated in FIG. 7. The separator 202 is a sheet impregnated with an electrolytic solution, which is to be an electrolyte 103, and is configured to sandwich the anode 102. The two sheets of the separator 202 sandwiching the anode 102 may be integrated.

In the metal-air battery 100 with the configuration mentioned above, the separator 202 may be constituted by a sheet of a water absorbing insulator such as a coffee filter, kitchen paper, or filter paper. For example, as the separator 202, it is particularly preferable to use a sheet of a naturally degradable material such as a cellulose based separator made from plant fibers.

The metal-air battery 100 constituted by the naturally degradable material mentioned above is naturally degraded over time when used in a disposable device such as a soil moisture sensor, and hence does not need to be recovered. Also, since the battery is constituted by a nature derived material or fertilizer component, the load on the environment is extremely low. There is no need to recover the battery when it is used not only in soil but also in the natural world such as forest and ocean. In addition, when used in an ordinary living environment, the battery can be disposed as burnable waste.

EXAMPLE 1

At first, Example 1 will be described. Example 1 is an example in which a co-continuous body having a three dimensional network structure formed of a plurality of nanosheets and nanofibers integrated through a noncovalent bond, which is produced in the production method 1, is used as the cathode 101. The cathode 101 was synthesized as follows. In the following description, as a representative example, zinc is used for the anode 102. However, another metal-air battery 100 can be fabricated by changing the zinc to an anode made of another material.

Method for Fabricating Cathode

A method for fabricating the cathode 101 will be described. In the following description, a production method using graphene as the nanosheets and carbon nanofibers as the nanofibers will be shown as a typical example. By changing graphene and carbon nanofibers to nanosheets and nanofibers made of other materials, the co-continuous body having a three dimensional network structure can be adjusted. Note that the porosity shown below was calculated from the pore size distribution obtained by performing a mercury press-in method on the co-continuous body, modeling pores as a cylindrical shape.

At first, a method for fabricating the cathode 101 when using nanosheets as the cathode 101 will be described. A commercially available graphene sol [a dispersion medium: water ($H_2O$), 0.4% by weight, silicon manufactured by Sigma-Aldrich] was placed in a test tube, and this test tube was dipped in liquid nitrogen for 30 minutes to completely freeze the graphene sol. After completely freezing the graphene sol, the frozen graphene sol was taken out into an eggplant shaped flask and dried in a vacuum of 10 Pa or less by using a freeze drying machine (manufactured by TOKYO RIKAKIKAI CO., LTD.), thereby obtaining a stretchable co-continuous body having a three dimensional network structure including graphene nanosheets.

The obtained co-continuous body was evaluated by performing X-ray diffraction (XRD) measurement, scanning electron microscope (SEM) observation, porosity measurement, a tension test, and BET specific surface area measurement. The co-continuous body fabricated in an embodiment of the present invention was confirmed to be a carbon (C, PDF card No. 01-075-0444) single phase through the XRD measurement. Note that the PDF card No. is the card number of the PDF (Powder Diffraction File), which is a database collected by ICDD (International Centre for Diffraction Data), and the same applies hereinafter.

It was also confirmed through the SEM observation and the mercury press-in method that the obtained co-continuous body is a co-continuous body in which the nanosheets (graphene pieces) continuously range and the average pore size is 1 μm. In addition, when the BET specific surface area of the co-continuous body was measured through the mercury press-in method, it was found to be 500 $m^2/g$. Also, when the porosity of the co-continuous body was measured through the mercury press-in method, it was found to be 87% or more. Furthermore, it was confirmed from the result of the tension test that, even when a strain of 20% was applied by tensile stress, the obtained co-continuous body does not depart from the elastic region and is restored to the shape before the application of the stress.

Next, a method for fabricating the cathode 101 when using nanofibers as the cathode 101 will be described. The method for evaluating the co-continuous body was carried out in the same manner as for the above-mentioned co-continuous body made of nanosheets, and the fabrication of a zinc-air battery was carried out.

The co-continuous body was fabricated in the same manner as in the above-mentioned method for fabricating the cathode 101 formed of nanosheets, and a carbon nanofiber sol [a dispersion medium: water ($H_2O$), 0.4% by weight, manufactured by Sigma-Aldrich] was used as a raw material.

The obtained co-continuous body was evaluated by performing XRD measurement, SEM observation, porosity measurement, a tension test, and BET specific surface area measurement. The co-continuous body fabricated in an embodiment of the present invention was confirmed to be a carbon (C, PDF card No. 00-058-1638) single phase through the XRD measurement. It was also confirmed through the SEM observation and the mercury press-in method that the obtained co-continuous body is a co-continuous body in which the nanofibers continuously range and the average pore size is 1 μm. In addition, when the BET specific surface area of the co-continuous body was measured through the mercury press-in method, it was found to be 600 $m^2/g$. Also, when the porosity of the co-continuous body was measured through the mercury press-in method, it was found to be 90% or more. Furthermore, it was confirmed from the result of the tension test that, even when a strain of 40% was applied by tensile stress, the co-continuous body made of nanofibers does not depart from the elastic region and is restored to the shape before the application of the stress.

Method for Fabricating Battery and Method of Discharge Test

Using the above-described cathode, a zinc-air battery with a wound structure described using FIG. 7 and FIG. 8 was fabricated. At first, the cathode 101 was allowed to sufficiently contain ethanol, and was pressed with a ceramic plate to reduce its thickness and also to remove extra ethanol. The squashed cathode (30 mm×40 mm) was superimposed on the carbon cloth of the current collector, which had been cut out to 40 mm×180 mm. After that, a zinc plate (40 mm×180 mm, t=0.2 mm) of the anode sandwiched by a cellulose based separator (manufactured by NIPPON KODOSHI CORPORATION, 50 mm×200 mm) was superimposed thereon. After being superimposed, they were wound and placed inside a tube that had been molded with a biodegradable resin as the housing, thereby fabricating a battery with a wound structure.

As the electrolyte, a solution prepared by dissolving potassium chloride (KCl, manufactured by KANTO KAGAKU) in pure water at a concentration of 1 mol/L was used.

Figure 9:
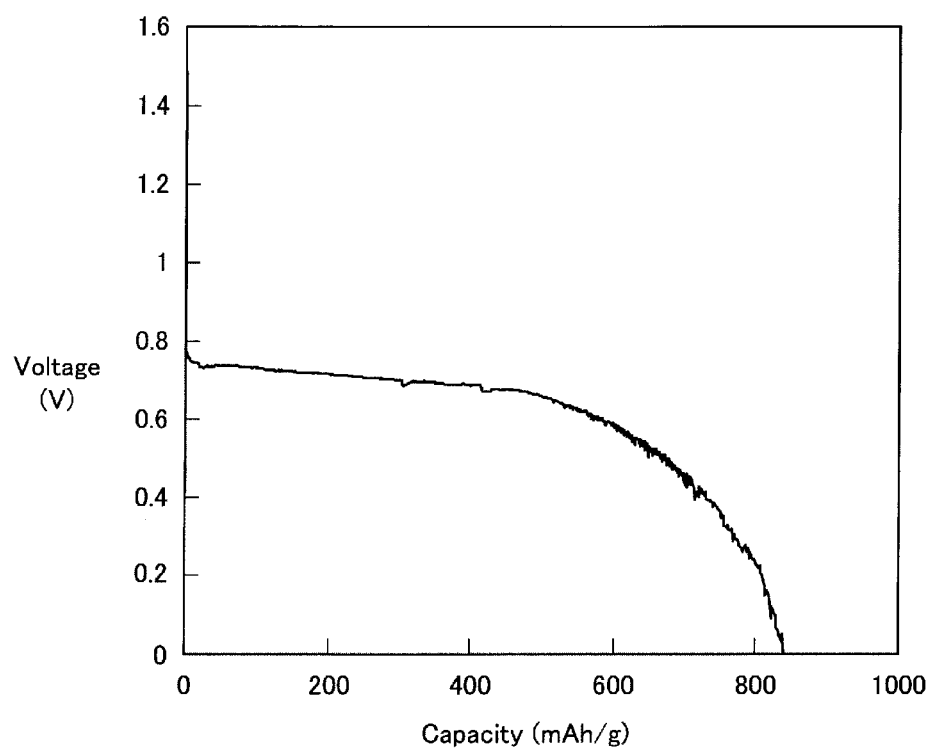
FIG. 9 is a characteristic diagram showing the initial discharge curve of a zinc-air battery according to Example 1 of the present invention.

A discharge test was performed on the fabricated zinc-air battery with a wound structure. The discharge test for the zinc-air battery was conducted by using a commercially available charge/discharge measurement system (the SD8 charge/discharge system manufactured by HOKUTO DENKO CORPORATION). An electric current was supplied at a current density of 0.1 mA/$cm^2$ per unit effective area of the cathode 101, and measurement was continued until the battery voltage was decreased to 0 V from the open circuit voltage. In the discharge test for the battery, the measurement was conducted in a thermostatic tank at 25° C. (the atmosphere was an ordinary living environment). The discharge capacity was represented as the value (mAh/g) per weight of the cathode formed of the co-continuous body. FIG. 9 shows the discharge curve for a case where graphene was used as the cathode 101 in Example 1.

The following Table 1 shows the discharge capacity of a zinc-air battery using commercially available carbon powder as the cathode 101 and using a zinc plate as the anode 102. Table 1 shows the discharge capacities of zinc-air batteries with a wound structure in which the co-continuous bodies were constituted from nanosheets made of carbon (C), iron oxide ($Fe_2O_3$), manganese oxide ($MnO_2$), zinc oxide (ZnO), molybdenum oxide ($MoO_3$), and molybdenum sulfide ($MoS_2$), and nanofibers made of carbon (C), iron oxide ($Fe_2O_3$), manganese oxide ($MnO_2$), zinc oxide (ZnO), molybdenum oxide ($MoO_3$), and molybdenum sulfide ($MoS_2$) and used as the cathode 101.

TABLE 1

| | Cathode material | Discharge capacity (mAh/g) | Voltage (V) |
|---|---|---|---|
| Nanosheet material | Graphene (C) | 840 | 0.67 |
| | Iron oxide ($Fe_2O_3$) | 800 | 0.65 |
| | Manganese oxide ($MnO_2$) | 810 | 0.63 |
| | Zinc oxide (ZnO) | 820 | 0.63 |
| | Molybdenum oxide ($MoO_3$) | 800 | 0.62 |
| | Molybdenum sulfide ($MoS_2$) | 800 | 0.64 |

TABLE 1-continued

|  | Cathode material | Discharge capacity (mAh/g) | Voltage (V) |
|---|---|---|---|
| Nanofiber material | Carbon nanofiber (C) | 860 | 0.67 |
|  | Iron oxide ($Fe_2O_3$) | 820 | 0.63 |
|  | Manganese oxide ($MnO_2$) | 820 | 0.64 |
|  | Zinc oxide (ZnO) | 810 | 0.63 |
|  | Molybdenum oxide ($MoO_3$) | 820 | 0.64 |
|  | Molybdenum sulfide ($MoS_2$) | 830 | 0.65 |
| Comparative Example 1 (powdery carbon) | | 650 | 0.55 |
| Comparative Example 2 (Graphene) | | 820 | 0.50 |

Example 1 exhibited an average discharge voltage of 0.65 V or more and a discharge capacity of 800 mAh/g or more, which were greater than those of the zinc-air battery of Comparative Example 1, which used powdery carbon (KETJENBLACK EC600JD) as the cathode. This is presumably because, in the case where co-continuous bodies made of nanosheets or co-continuous bodies made of nanofibers were used, they had larger specific surface areas and the discharge product [$Zn(OH)_2$] was thus efficiently deposited, resulting in improved discharge capacity. Furthermore, the values were larger than those of Comparative Example 2, in which the battery was wound without allowing the cathode 101 to contain ethanol. This is presumably because, when the battery was wound after allowing the cathode to contain ethanol to eliminate its thickness as in Example 1, collapse of the co-continuous body of the cathode 101 could be suppressed and reduction of the conductive path in the cathode 101 could be suppressed, resulting in improved voltage.

EXAMPLE 2

In Example 2, a cathode 101 will be described, which is configured by allowing a co-continuous body made of carbon nanofibers to support an oxide or metal as a catalyst. In the following, a case in which the co-continuous body is allowed to support $MnO_2$ as a catalyst will be described as a typical example, but by changing Mn to an arbitrary metal, an arbitrary oxide is allowed to be supported on the co-continuous body as a catalyst. In addition, by not performing neutralization step, an arbitrary metal is allowed to be supported on the co-continuous body as a catalyst.

The methods for fabricating and evaluating the co-continuous body, the fabrication of a zinc-air battery, and the method of a discharge test were carried out in the same manner as in Example 1. Subsequently, commercially available manganese (II) chloride tetrahydrate ($MnCl_2.4H_2O$; manufactured by KANTO KAGAKU) was dissolved in distilled water, and the fabricated co-continuous body was impregnated with the solution, thereby allowing manganese chloride to be supported. Then, neutralization was carried out by gradually dropping aqueous ammonia (28%) on the co-continuous body supporting manganese chloride (or on manganese chloride supported by the co-continuous body) until the pH became 7.0, thereby depositing manganese hydroxide. The deposit was repeatedly washed with distilled water five times so that no chlorine remained.

The obtained co-continuous body supporting manganese hydroxide was subjected to a heat treatment at 500° C. in an argon atmosphere for 6 hours, thereby fabricating a co-continuous body supporting manganese oxide ($MnO_2$). The co-continuous body supporting manganese oxide thus fabricated was evaluated by performing XRD measurement and TEM observation. Through the XRD measurement, the peak of manganese oxide ($MnO_2$, PDF file No. 00-011-079) were observed. It was confirmed that the catalyst supported by the co-continuous body was a manganese oxide single phase. In addition, with the TEM, manganese oxide was observed to be deposited in the form of particles having an average particle size of 100 nm on the surface of the co-continuous body.

By using this co-continuous body supporting manganese oxide as the cathode 101, a zinc-air battery was fabricated. The following Table 2 also shows the results when using other catalysts.

TABLE 2

| Catalyst/co-continuous body material | Discharge voltage (V) |
|---|---|
| $MnO_2$/C | 0.85 |
| $Fe_2O_3$/C | 0.82 |
| ZnO/C | 0.80 |
| $MoO_3$/C | 0.83 |
| Fe/C | 0.85 |
| Mn/C | 0.82 |
| Zn/C | 0.83 |
| Mo/C | 0.83 |
| Example 1(C) | 0.67 |

In Example 2, the average discharge voltage was 0.85 V, the value of which is larger than that of the case when using the co-continuous body of Example 1 not supporting the catalyst. It is believed that not only the stretchability of the cathode 101, but also the supporting of the catalyst on the cathode 101 lowered the reaction resistance in the cathode 101 and improved the discharge voltage.

EXAMPLE 3

In Example 3, a case in which "a co-continuous body made of a gel in which nanofibers produced by a bacterium had been dispersed" or "a co-continuous body made of a gel in which cellulose produced by a bacterium had been dispersed" was allowed to support manganese oxide as a catalyst will be described. In the following, a case where nanofibers made of iron oxide produced by an iron bacterium were used as the "nanofibers produced by a bacterium" will be presented. However, by changing the iron bacterium to an arbitrary bacterium, a co-continuous body made of nanofibers made of manganese oxide can be adjusted.

The method for evaluating the co-continuous body, the method for fabricating a zinc-air battery, and the method of a discharge test were carried out in the same manner as in Examples 1 and 2.

Method for Fabricating Co-Continuous Body Made of Gel in Which Nanofibers Produced by Bacterium are Dispersed At first, *Leptothrix ochracea,* which is an iron bacterium, was placed in a JOP liquid culture medium in a test tube together with iron pieces (purity: 99.9% or more, manufactured by Kojundo Chemical Lab. Co., Ltd.), and was cultured on a shaker at 20° C. for days. The JOP liquid culture medium is a culture medium containing, in 1 L of sterilized ground water, 0.076 g of disodium hydrogen phosphate dodecahydrate, 0.02 g of potassium dihydrogen phosphate dihydrate, 2.383 g of HEPES [4-(2-hydroxyethyl)-1-piperazineethanesulfonic acid: a substance for a buffer solution], and 0.01 mmol/L of iron sulfate, the pH of which is adjusted to 7.0 with an aqueous sodium hydroxide solution. Also, *Leptothrix ochracea* was purchased from ATCC (American Type Culture Collection).

After the culture, the iron pieces were removed, and the obtained gel was washed in pure water for 24 hours by using a shaker. In this washing, pure water was changed three times. By using the washed gel as a raw material, a co-continuous body was fabricated according to the same process as described in Example 1. After that, a zinc battery was fabricated in the same manner as the battery fabrication method described in Example 1 and the catalyst supporting method described in Example 2.

The obtained co-continuous body was evaluated by performing XRD measurement, SEM observation, porosity measurement, a tension test, and BET specific surface area measurement. The co-continuous body fabricated in an embodiment of the present invention was confirmed to be amorphous $Fe_3O_4$ and $\gamma$-$Fe_2O_3$ ($Fe_3O_4$, PDF card No. 01-075-1372 and $\gamma$-$Fe_2O_3$, PDF card No. 00-039-1346) through the XRD measurement.

It was also confirmed through the SEM observation that the obtained co-continuous body is a co-continuous body in which hollow nanofibers (nanotubes) having a diameter of 1 µm continuously range. In addition, when the BET specific surface area of the co-continuous body was measured through the mercury press-in method, it was found to be 780 m²/g. Also, when the porosity of the co-continuous body was measured through the mercury press-in method, it was found to be 94% or more. Furthermore, it was confirmed from the result of the tension test that, even when a strain of 60% was applied by tensile stress, the obtained co-continuous body does not depart from the elastic region and is restored to the shape before the application of the stress.
Method for Fabricating Co-Continuous Body Made of Gel in Which Cellulose Produced by Bacterium are Dispersed Next, a fabrication method by which a co-continuous body made of a gel in which cellulose produced by a bacterium has been dispersed is further allowed to support manganese oxide as a catalyst will be described.

At first, nata de coco (manufactured by Fujicco) was provided as a bacterial cellulose gel produced by *Acetobacter xylinum*, which is an *Acetobacter*, and then, using this nata de coco, a zinc battery was fabricated in the same manner as the battery fabrication method described in Example 1 and the catalyst supporting method described in Example 2. Note that, when using the bacterial cellulose gel, it was dried in a vacuum and the co-continuous body was then carbonized through calcination in a nitrogen atmosphere at 1200° C. for 2 hours, thereby fabricating a cathode.

The obtained co-continuous body (carbonized co-continuous body) was evaluated by performing XRD measurement, SEM observation, porosity measurement, a tension test, and BET specific surface area measurement. This co-continuous body was confirmed to be a carbon (C, PDF card No. 01-071-4630) single phase through the XRD measurement. It was also confirmed through the SEM observation that the obtained co-continuous body is a co-continuous body in which nanofibers having a diameter of 20 nm continuously range. In addition, when the BET specific surface area of the co-continuous body was measured through the mercury press-in method, it was found to be 830 m²/g. Also, when the porosity of the co-continuous body was measured through the mercury press-in method, it was found to be 99% or more. Furthermore, it was confirmed from the result of the tension test that, even when a strain of 80% was applied by tensile stress, the co-continuous body of Example 5 does not depart from the elastic region and is restored to the shape before the application of the stress, and that the co-continuous body has excellent stretchability even after the carbonization.

The discharge voltages of the zinc-air battery in which the co-continuous body made of the iron oxide nanofibers produced by the iron bacterium was used as the cathode 101 and the zinc-air battery in which the co-continuous body made of the cellulose nanofibers produced by the bacterium was used as the cathode 101 in Example 3 are shown in the following Table 3. In addition, the following Table also shows the result when using a co-continuous body made of manganese oxide nanofibers produced by a bacterium.

TABLE 3

| Catalyst/co-continuous body material | Discharge voltage (V) |
|---|---|
| $MnO_2$/bacterium-produced iron oxide | 0.92 |
| $MnO_2$/bacterium-produced MnO2 | 0.97 |
| $MnO_2$/carbonized bacterial cellulose | 1.02 |

In Example 3, as shown in Table 3, the zinc-air battery including the cathode 101 using a co-continuous body made of manganese oxide produced by a bacterium and supporting manganese oxide as a catalyst exhibited an average discharge voltage of 0.97 V, the value of which is larger than that of Example 2. The manganese oxide produced by a bacterium was produced by culturing *Leptothrix discophora*, which is a manganese bacterium, in the same manner as mentioned above by using manganese pieces (purity: 99.9% or more, manufactured by Kojundo Chemical Lab. Co., Ltd.). *Leptothrix discophora* was purchased from ATCC. In the case of nanofibers produced by this bacterium as well, similar to the iron oxide produced by the iron bacterium, the cathode 101 produced by the bacterium having excellent stretchability efficiently carried out oxygen reduction, and this presumably improved the discharge voltage.

Furthermore, the zinc-air battery including the cathode 101 using a co-continuous body made of cellulose produced by a bacterium and supporting manganese oxide as a catalyst exhibited an average discharge voltage of 1.02 V, the value of which is larger than that of the case when using a co-continuous body supporting manganese oxide and containing iron oxide produced by an iron bacterium.

The improvement in characteristics as described above is presumably because, by using the co-continuous body having higher stretchability, the cathode 101 efficiently deposited the discharge product [$Zn(OH)_2$] during discharge and also the reaction was performed smoothly due to excellent electrical conductivity of C.

As mentioned above, according to an embodiment of the present invention, a co-continuous body having high porosity and stretchability is obtained. In addition, a zinc-air battery using this co-continuous body having catalytic activity as the cathode 101 achieves efficient deposition of the discharge product [$Zn(OH)_2$] during discharge. The improvement in characteristics as described above is presumably because of a variety of improvements according to an embodiment of the present invention.

EXAMPLE 4

Next, Example 4 will be described. Example 4 describes a case where the entire surface of the current collector 104 was impregnated with a biodegradable resin to improve the electrical conductivity of the current collector 104. Hereinafter, a method for fabricating the current collector 104 will be described.

For the cathode 101, cellulose nanofibers produced by a bacterium using manganese oxide as a catalyst used in Example 3 were used, and the method for fabricating a zinc-air battery and the method of a discharge test were carried out in the same manner as in Example 1.

As for the current collector 104 in Example 4, a current collector cut out in the same manner as in Example 1 and a biodegradable resin cut out in the same size were superimposed, a heat press was set at 200° C., and a pressure of 1 MPa was applied for 10 seconds to impregnate the entire surface of the current collector with the biodegradable resin, thereby fabricating a current collector 104 formed of an electrically conductive unit 201a.

The following Table 4 shows the discharge voltage and the discharge capacity of a zinc-air battery using the current collector 104 in Example 4, the entire surface of which is impregnated with the biodegradable resin and having only the electrically conductive unit 201a. Table 4 also shows the result of Example 5.

TABLE 4

| Example | Average discharge voltage (V) | Discharge capacity (mAh/g) |
|---|---|---|
| Example 3 (without collector unit/without air intake unit) | 1.02 | 1040 |
| Example 4 (with collector unit/without air intake unit) | 1.08 | 600 |
| Example 5 (with collector unit/with air intake unit) | 1.11 | 1050 |

As shown in Table 4, Example 4 exhibited 1.08 V and a capacity of 600 mAh/g. This is presumably because the current collector 104 was solidified with the biodegradable resin, which thus lowered the resistance among the current collector 104, thereby improving the voltage. Also, the decrease in capacity is presumably because the entire surface was impregnated with the biodegradable resin, which thus reduced the breathability of the current collector 104 and caused a lack of air supply to the cathode, resulting in the battery reaction in the cathode not being able to occur.

EXAMPLE 5

Next, Example 5 will be described. Example 5 is an example in which a part of the current collector 104 was impregnated with a biodegradable resin, thereby improving the electrical conductivity of the current collector 104 while ensuring breathability. In Example 4, the entire surface of the current collector 104 was impregnated with the biodegradable resin, which caused the cathode to fail to react with oxygen in the air, and the reaction was finished, resulting in a decrease in capacity. So, in Example 5, an example of a zinc-air battery was performed using a current collector 104 in which the surface in contact with the cathode 101 was not allowed to contain a biodegradable resin and was used as an air intake unit 201b.

For the cathode 101, cellulose nanofibers produced by a bacterium using manganese oxide as a catalyst used in Example 3 were used, and the method for fabricating a zinc-air battery and the method of a discharge test were carried out in the same manner as in Example 1.

The current collector 104 in Example 5 is formed of a current collector 104 cut out in the same manner as in Example 1 and a biodegradable resin cut out in the same size. Of the current collector 104, a hole (25 mm×35 mm), which is one size smaller than that of the cathode 101 (30 mm×40 mm), is made in the part where the cathode 101 will be superimposed to form the air intake unit 201b. The part other than the air intake unit 201b of the current collector 104 is impregnated with the biodegradable resin in the same manner as in Example 4. The part impregnated with the biodegradable resin will be the electrically conductive unit 201a with enhanced electrical conductivity. In addition, of the current collector 104, the part other than the electrically conductive unit 201a, specifically the part not impregnated with the biodegradable resin, will be the air intake unit 201b, which allows for easy air intake.

The above-described Table 4 shows the discharge voltage and the discharge capacity of a zinc-air battery using the current collector 104 in Example 5, which has the electrically conductive unit 201a and the air intake unit 201b.

As shown in Table 4, Example 5 exhibited 1.11 V and a capacity of 1050 mAh/g. As for the voltage, the effect was better than in Example 4. This is presumably because a part of the current collector 104 was solidified with the biodegradable resin and provided with the electrically conductive unit 201a, which thus lowered the resistance among the current collector 104. Furthermore, this is presumably because the provision of the air intake unit 201b resulted in a sufficient air supply to the cathode 101, which lowered the reaction resistance at the cathode 101. In addition, as for the capacity, it was improved to the same level as in Example 3 because the battery reaction could continue until the anode was completely consumed due to the provision of the air intake unit 201b, unlike Example 4 where the battery reaction in the cathode 101 did not occur, which resulting in a smaller capacity.

COMPARATIVE EXAMPLE 1

Next, Comparative Example 1 will be described. In Comparative Example 1, a zinc-air battery was fabricated using the same current collector and structure as in Example 1, and using commercially available powdery carbon as the cathode. The conditions of a discharge test for the battery were the same as in Example 1.

Hereinafter, a method for fabricating the cathode of Comparative Example 1 will be described.

At first, KETJENBLACK powder (manufactured by Lion Specialty Chemicals Co., Ltd.) and polytetrafluoroethylene (PTFE) powder (manufactured by DAIKIN INDUSTRIES, LTD.) were sufficiently pulverized and mixed at a weight ratio of 80:20 by using a mortar machine, and subjected to roll forming, thereby obtaining a sheet-like cathode (thickness: 0.6 mm). This sheet-like cathode was cut to match the size (30×40 mm) of the cathode 101 used in Example 1.

Using this cathode, an air battery was fabricated in the same manner as in Example 1. The conditions of a discharge test for the battery were the same as in Example 1.

The average discharge voltage of the zinc-air battery according to Comparative Example 1 is shown in Table 1, together with the results of Example 1 and Comparative Example 2.

As shown in Table 1, the average discharge voltage of Comparative Example 1 was 0.55 V, the value of which is smaller than that in Example 1. This is presumably because the cathode did not have stretchability, which weakened the force to spread from the inside to the outside of the battery when it was wound and parts where gaps were easily formed were observed between the electrodes, which raised the contact resistance.

COMPARATIVE EXAMPLE 2

Next, Comparative Example 2 will be described. In Comparative Example 2, a zinc-air battery was fabricated by using the same current collector as in Example 1 and graphene of Example 1 for the cathode, and superimposing the separator and anode without allowing the cathode to contain ethanol at the time of fabricating the battery. The conditions of a discharge test for the battery were the same as in Example 1.

The average discharge voltage of the zinc-air battery according to Comparative Example 2 is shown in Table 1, together with the result of Example 1.

As shown in Table 1, the average discharge voltage of Comparative Example 2 was 0.50 V, and the exhibited value was smaller than that of the case when using graphene for the cathode 101 of Example 1. When the cathode of Comparative Example 2 was observed after the measurement, it was observed that, since the wound structure was made while the cathode was in a thick state, bending force was non-uniformly applied to the cathode, causing cracks and chips to appear here and there on the cathode, and the conductive path was cut off. On the other hand, when the cathode 101 in Example 1 after the measurement was observed, it could be dried in a bent state and was thus bent with few cracks.

From these results, it was confirmed that the zinc-air batteries according to embodiments of the present invention are superior in voltage and capacity to a zinc-air battery using a cathode made of a publicly known material.

As described above, in embodiments of the present invention, the metal-air battery 100 using the cathode 101 formed of a co-continuous body having a three dimensional structure formed by an integrated plurality of nanostructures having branches does not use a binder and thus poses a low environmental load. Also, since the current collector 104 has the electrically conductive unit 201a and the air intake unit 201b, the metal-air battery 100 does not inhibit the cathode reaction, and it is also possible to produce a current collector with high electrical conductivity. In addition, since the metal-air battery 100 can suppress the collapse of the cathode 101 by allowing the cathode 101 to contain a liquid during winding, it can be made into a metal-air battery with a wound structure while maintaining the environmental load in terms of materials to be low. Moreover, since the metal-air battery 100 enables a wound structure, the electrode area can be made larger, which means that the capacity can be increased.

It is suggested that when the wound structure is made, various structures can be taken while maintaining the structure by allowing the cathode 101 to contain a volatile solvent such as ethanol before winding, which will make the zinc-air battery easier to be handled. The zinc-air batteries according to embodiments of the present invention do not contain any metal elements other than the elements used in fertilizers for soil or metals contained in rain water and sea water, and are also naturally degradable, which extremely decreases the environmental load. Such a battery can be effectively utilized as a disposable battery in a daily environment, as well as the driving source for various devices such as a sensor to be used in soil. In addition, according to embodiments of the present invention, the discharge capacity and discharge voltage of the zinc-air batteries can be increased.

Note that the present invention is not limited to the embodiments described above, and it is obvious that those having ordinary skill in the art can make many modifications and combinations without departing from the technical idea of the invention.

REFERENCE SIGNS LIST

100 Metal-air battery
101 Cathode
102 Anode
103 Electrolyte
104 Current collector
105 Housing
201a Electrically conductive unit
201b Air intake unit
202 Separator

The invention claimed is:

1. A metal-air battery comprising:
a cathode formed of a co-continuous body having a three dimensional network structure formed by an integrated plurality of nanostructures having branches, wherein the cathode contains a volatile liquid that does not alter a structure of the cathode;
a foil- or plate-like anode formed of a metal;
a separator that absorbs a liquid, which is to be an electrolytic solution; and
a foil- or plate-like current collector formed of a metal, wherein the metal-air battery is formed with a wound structure in which the current collector, the cathode, the separator, the anode, and the separator are superimposed and wound in this order.

2. The metal-air battery according to claim 1, wherein the plurality of nanostructures are:
a nanosheet constituted by at least one of carbon, iron oxide, manganese oxide, zinc oxide, molybdenum oxide, or molybdenum sulfide; or
a nanofiber constituted by at least one of carbon, iron oxide, manganese oxide, zinc oxide, molybdenum oxide, molybdenum sulfide, or cellulose.

3. The metal-air battery according to claim 2, wherein the current collector comprises:
an electrically conductive unit with enhanced electrical conductivity; and
an air intake unit that allows for easy air intake.

4. The metal-air battery according to claim 1, wherein the metal-air battery comprises a catalyst supported by the cathode, and
the catalyst is constituted by at least one metal among iron, manganese, zinc, copper, or molybdenum, or an oxide of at least one metal among calcium, iron, manganese, zinc, copper, or molybdenum.

5. The metal-air battery according to claim 4, wherein the current collector comprises:
an electrically conductive unit with enhanced electrical conductivity; and
an air intake unit that allows for easy air intake.

6. The metal-air battery according to claim 1, wherein the current collector comprises:
an electrically conductive unit with enhanced electrical conductivity; and
an air intake unit that allows for easy air intake.

7. A method for producing a cathode of a metal-air battery, comprising:
a freezing step of freezing a sol or gel in which a nanostructure is dispersed to obtain a frozen body;
a drying step of drying the frozen body in a vacuum to obtain a cathode formed of a co-continuous body;
allowing the cathode to contain a volatile liquid that does not alter a structure of the cathode; and
superimposing and winding a foil- or plate-like current collector formed of a metal, the cathode, a separator that absorbs a liquid, which is to be an electrolytic solution, a foil- or plate-like anode formed of a metal, and the separator in this order to thereby form a wound structure.

8. A method for producing a cathode of a metal-air battery, comprising:
- a gel production step of allowing a bacterium to produce a gel in which a nanofiber made of any of iron oxide, manganese oxide, or cellulose is dispersed;
- a freezing step of freezing the gel;
- a drying step of drying a frozen body of the gel to obtain a cathode formed of a co-continuous body;
- allowing the cathode to contain a volatile liquid that does not alter a structure of the cathode; and
- superimposing and winding a foil- or plate-like current collector formed of a metal, the cathode, a separator that absorbs a liquid, which is to be an electrolytic solution, a foil- or plate-like anode formed of a metal, and the separator in this order to thereby form a wound structure.

9. The method for producing a cathode of a metal-air battery according to claim 8, the method further comprising:
- a carbonization step of, when the nanofiber is made of cellulose, carbonizing the co-continuous body obtained in the drying step, by heating in a gas atmosphere in which the cellulose is not burned.

* * * * *